United States Patent
Gila et al.

(10) Patent No.: US 8,149,100 B2
(45) Date of Patent: Apr. 3, 2012

(54) DEVICE AND METHOD FOR DISTINGUISHING POSITIONS OF TIRE SENSORS OF A DOUBLE TIRE SYSTEM

(75) Inventors: Janos Gila, Mödling (AT); Alfred Pohl, Mistelbach (AT); Robert Tschofen, Vienna (AT); Johannes Österreicher, Perchtoldsdorf (AT)

(73) Assignee: Continental Automotive GmbH, Hannover (DE)

( * ) Notice: Subject to any disclaimer, the term of this patent is extended or adjusted under 35 U.S.C. 154(b) by 477 days.

(21) Appl. No.: 12/240,249

(22) Filed: Sep. 29, 2008

(65) Prior Publication Data

US 2009/0085734 A1 Apr. 2, 2009

(30) Foreign Application Priority Data

Sep. 28, 2007 (DE) .................. 10 2007 046 495

(51) Int. Cl.
*B60C 23/00* (2006.01)

(52) U.S. Cl. ........ 340/447; 73/146.5; 340/442; 340/445

(58) Field of Classification Search .......... 340/442–447, 340/686.1, 686.6; 73/146, 146.5
See application file for complete search history.

(56) References Cited

U.S. PATENT DOCUMENTS

| | | | | |
|---|---|---|---|---|
| 7,482,921 B2 * | 1/2009 | Froitzheim et al. | ...... | 340/539.21 |
| 7,577,500 B2 * | 8/2009 | Nihei et al. | ...... | 701/1 |
| 7,817,023 B2 * | 10/2010 | Shimura | ...... | 340/442 |
| 2004/0021562 A1 * | 2/2004 | Prenninger | ...... | 340/445 |
| 2004/0246117 A1 * | 12/2004 | Ogawa et al. | ...... | 340/445 |
| 2005/0187667 A1 * | 8/2005 | Vredevoogd et al. | ...... | 701/1 |
| 2006/0001535 A1 * | 1/2006 | Hafele et al. | ...... | 340/445 |
| 2006/0012475 A1 | 1/2006 | Froitzheim et al. | | |
| 2008/0129478 A1 * | 6/2008 | Fink et al. | ...... | 340/447 |

FOREIGN PATENT DOCUMENTS

| | | |
|---|---|---|
| DE | 102004034876 A1 | 3/2006 |
| DE | 102006012534 A1 | 10/2006 |
| DE | 102006012535 A1 | 10/2006 |

OTHER PUBLICATIONS

German Office Action dated Sep. 18, 2008.

* cited by examiner

*Primary Examiner* — Brent Swarthout
(74) *Attorney, Agent, or Firm* — Laurence A. Greenberg; Werner H. Stemer; Ralph E. Locher

(57) ABSTRACT

A device and a method for distinguishing positions of two tire sensors of a double tire include an LF antenna attached to a vehicle and connected to a central processing unit and one tire sensor each per tire. The tire sensors have a device for measuring field strength of a signal emitted by the LF antenna and the tire sensors report back information on the measured field strength through the LF antenna to the central processing unit. The central processing unit determines the position of the two tire sensors of the double tire from a distribution or course of a current flow during wheel rotation.

16 Claims, 4 Drawing Sheets

DEVICE AND METHOD FOR DISTINGUISHING POSITIONS OF TIRE SENSORS OF A DOUBLE TIRE SYSTEM

CROSS-REFERENCE TO RELATED APPLICATION

This application claims the priority, under 35 U.S.C. §119, of German Patent Application DE 10 2007 046 495.0, filed Sep. 28, 2007; the prior application is herewith incorporated by reference in its entirety.

BACKGROUND OF THE INVENTION

Field of the Invention

The invention relates to a device and a method for distinguishing a position of two tire sensors WU (Wheel Units) of a double tire, including an LF antenna connected to the vehicle and to a central processing unit ECU, as well as one tire sensor WU each per tire.

Such devices are known in the prior art and are used for tire diagnostics, above all for monitoring air pressure in the tire. The problem of distinguishing the position of both tires in a double tire system, as is often used in a truck, always arises in that situation. Signals are transmitted regularly between the tire sensor WU and the vehicle system through an LF (low frequency) antenna attached in the vicinity of the double tire system. Usually one antenna is used per tire.

Before the system goes into normal operation in which, for instance, the air pressure is continuously monitored, it is necessary to identify the individual tires and to assign each identified tire a position. It is only in that way that the system can ascertain which tire in which position is affected and notify the driver accordingly in the event of a problem, such as irregular tire pressure.

Therefore, when starting the system, identification numbers of the individual tire sensors must be assigned to a tire position on the vehicle. For that purpose, an LF antenna is attached to the vehicle on each side of a vehicle axle and handles radio communication between the central processing unit ECU and tire sensor. Since the position of the LF antenna is known, the assignment of a position of an individual tire is easy to determine through the position of the communicating LF antenna. However, in double tire systems with two tires immediately next to each other, when using a single LF antenna, the position of the individual tires of the double tire system must be distinguished in addition.

To that end, in the prior art there is the possibility of using two LF antennas which are asymmetrically attached, so that their distance from the two tires is different. However, that has the disadvantage that the technical complexity increases since additional components, namely at least the additional antennas and the corresponding lines, are necessary. Determination of the position of double tires according to the prior art is therefore very expensive.

SUMMARY OF THE INVENTION

It is accordingly an object of the invention to provide a device and a method for distinguishing positions of tire sensors of a double tire system, which overcome the hereinafore-mentioned disadvantages of the heretofore-known devices and methods of this general type and which simplify evaluation while at the same time only giving rise to slight and inexpensive material and circuit complexity.

With the foregoing and other objects in view there is provided, in accordance with the invention, a device for distinguishing positions of tire sensors of a double tire on a vehicle. The device comprises two tire sensors each associated with a respective tire of the double tire, a central processing unit disposed on the vehicle, and an LF antenna disposed on the vehicle and connected to the central processing unit. The tire sensors have a device for measuring field strength of a signal emitted by the LF antenna, and the tire sensors report back information about the measured field strength through the LF antenna to the central processing unit. The central processing unit determines the position of the two tire sensors of the double tire from a course or distribution of a measured current flow during wheel rotation.

In accordance with another feature of the invention, in a special embodiment, the tire sensor WU has a microprocessor unit for processing the measured field strengths. Furthermore, it has proven advantageous if the tire sensor WU does not measure and transmit the absolute level of the current flow and consequently the field strength but only the amplitude swing. In the process, the tire sensor which measures the higher amplitude swing is regarded by the central processing unit ECU as the tire sensor closer to the LF antenna.

In accordance with a further feature of the invention, it is particularly favorable if the receiving coil of the tire sensor is mounted on the wheel at an angle both to the direction of rotation X and to the tire axle Y. The tire sensor can then advantageously determine the direction of current flow of the signal from the LF antenna received by the tire sensor and report through the LF antenna to the central processing unit ECU, with the central processing unit distinguishing the two tire sensors of the double tire from each other from the direction of current flow.

In accordance with an added feature of the invention, several possibilities are suitable for the position of the LF antenna. Thus, the LF antenna can be attached next to the double tire and thus not above the contact surface, and be disposed horizontally or vertically, for example.

In accordance with an additional feature of the invention, the LF antenna can also be attached over the contact surface of one of the two tires of the double tire so that the tire sensor, which substantially only receives the Y components of the signals beamed from the LF antenna, is identified as the tire sensor rotating under the LF antenna.

With the objects of the invention in view, there is also provided a method for distinguishing positions of two tire sensors of a double tire. The method comprises providing a device according to the invention, measuring the field strength of the signal emitted by the LF antenna, evaluating both field strengths received from the two tire sensors, and assigning the tire sensors to a particular position at the double tire depending on the measured field strength and the position of the LF antenna relative to a respective tire sensor.

In accordance with another mode of the invention, it is advantageous if only the amplitude swing and not the absolute level of current flow and thus the field strength is evaluated, with the higher amplitude swing being assigned to the tire sensor closer to the LF antenna.

In accordance with a further mode of the invention, the receiving coil of the tire sensor is disposed at an angle both to the direction of rotation X and to the tire axle Y, that is to say substantially diagonally, and the direction of the current flow of the signal received by the tire sensor from the LF antenna is determined in order to allocate the tire sensors to the various positions, with the directions in which both receiving coils of the tire sensors are mounted being distinguished.

With the objects of the invention in view, there is furthermore provided a method for distinguishing the positions of the two tire sensors (WU) of a double tire, which comprises varying the transmission power of the LF antenna emitting the signal, but not measuring the field strength in the tire sensor (WU). To this end, a device is used which has at least one LF antenna attached to the vehicle, connected to an evaluation unit and attached laterally next to the double tire and one tire sensor (WU) each per tire and in which the power of the signals emitted through the LF antenna can be varied. First, the transmission power for the transmission of a signal through the LF antenna is selected in such a way that it is high enough to enable reception by both tire sensors (WU) of the double tire. Then, a signal is transmitted through the LF antenna to the tire sensors (WU), with the tire sensors (WU) checking whether or not they have received the signal transmitted by the LF antenna. If both tire sensors (WU) have received the transmitted signal, the LF transmission power to transmit the signal through the LF antenna is gradually reduced and both the preceding method steps are repeated until only one tire sensor (WU) receives the transmitted signal. As soon as this is the case, the tire sensor (WU) which has continued to receive the signal is assigned to the position closest to the LF antenna, while the other tire sensor (WU) which has no longer received the transmitted signal is assigned to the position furthest from the LF antenna. In this way, the positions of the two tires of a double tire are likewise determined.

In accordance with a concomitant mode of the invention, a tire sensor (WU) which receives a signal transmitted by the LF antenna performs a change of status and as a result for its part occasions the transmission of a signal so that the transmission of a signal from a tire sensor (WU) is evaluated according to the previous transmission of a signal by an LF antenna as confirmation of receipt of the LF signal by the tire sensor (WU) and thus as a positively concluded test. It has proved successful if the signal transmitted by the tire sensor (WU) is received and evaluated by an intelligent receiver unit (IDA).

Other features which are considered as characteristic for the invention are set forth in the appended claims.

Although the invention is illustrated and described herein as embodied in a device and a method for distinguishing positions of tire sensors of a double tire system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
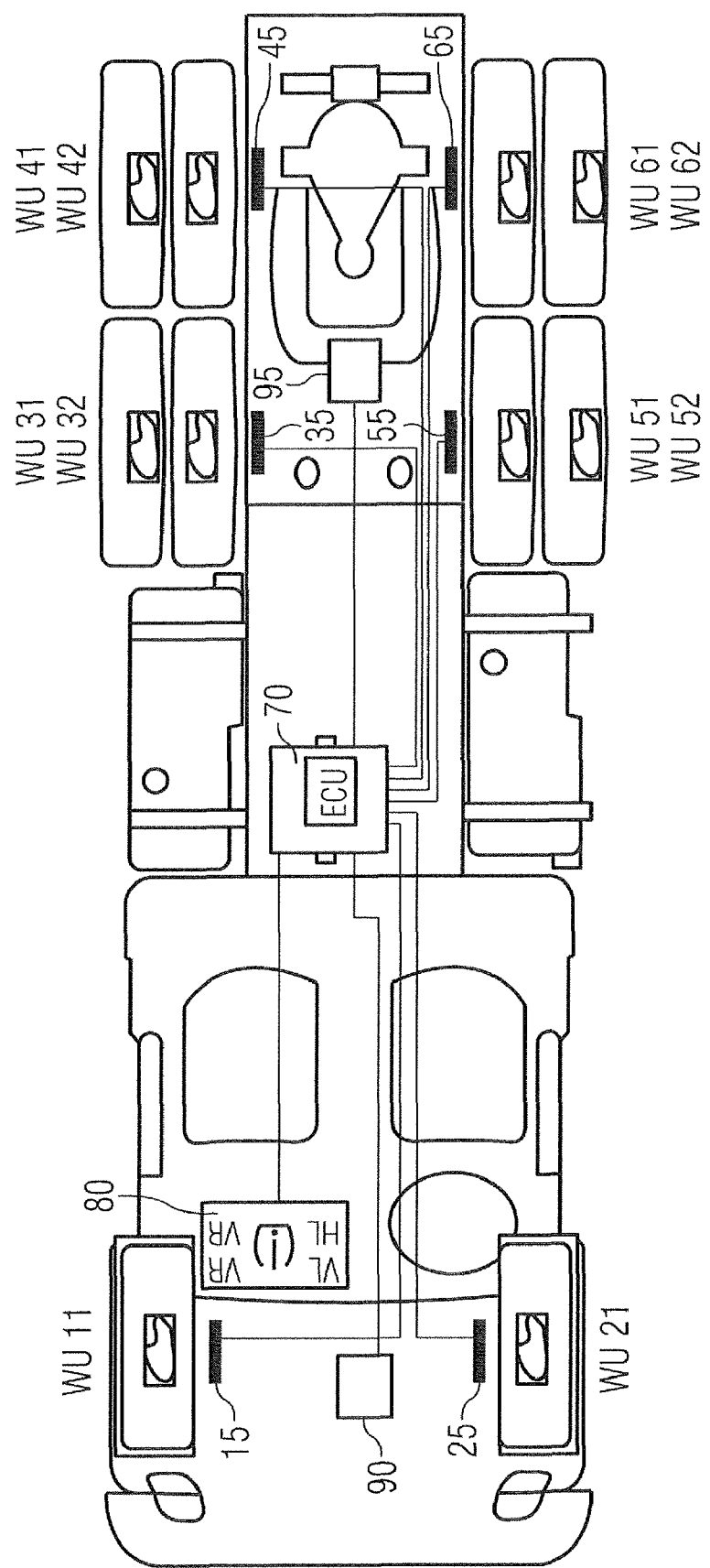
FIG. 1 is a diagrammatic, plan view of a truck having a typical configuration of a double tire system with an associated LF antenna.

Referring now to the figures of the drawings in detail and first, particularly, to FIG. 1 thereof, there is seen a diagrammatic view of a truck with four double tire systems on both rear axles, a central processing unit ECU 70 and six LF antennas 15, 25, 35, 45, 55, 65 connected to this central processing unit, with each of the four rear LF antennas 35, 45, 55, 65 leading to one double tire system. Two intelligent receiver antennas IDA 90, 95 and a display unit 80, which notifies a driver of a tire status, are also shown.

Figure 2:
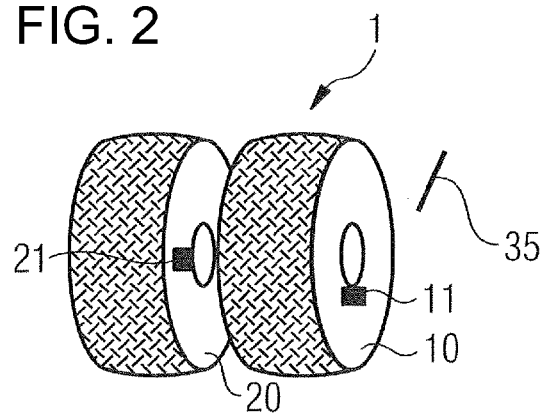
FIG. 2 is a perspective view of a double tire system with two tire sensors and a horizontally positioned LF transmission coil in an asymmetrical configuration.

FIG. 2 shows an insulated double tire system 1 with an outer tire 10 and an inner tire 20, which are each provided with a respective tire sensor 11, 21. Asymmetrically, i.e. disposed next to the tire, is an LF antenna 35, which is connected to the central processing unit ECU. In the specific example, the LF antenna is disposed horizontally.

Receiving coils of the tire sensors 11, 21 are not, as is standard in the prior art, disposed either in a direction of travel x or in an axle direction y of the tires, but diagonally, i.e. at an angle both to the direction of travel x and to the axle direction y. The tire sensors are thus able to measure the field strength of the signals emitted from the LF antenna in both direction x and direction y, and to determine the direction of a current, that is to say the sign of the field strength.

Figure 3:
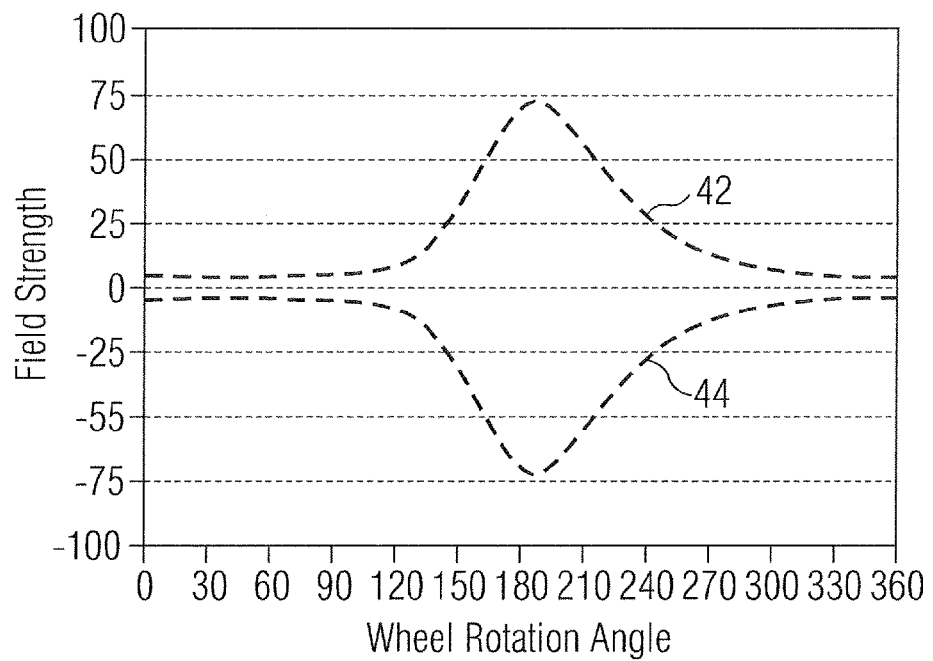
FIG. 3 is a graph illustrating field strength values depending on an angle of rotation of the tire in a configuration according to FIG. 2.

FIG. 3 shows an example of field strength values as measured in a configuration according to FIG. 2.

The field strengths received from the diagonally disposed receiving coil of the tire sensors can be seen with diagonally disposed receiving coils in the tire sensors 11, 21, with field strength distributions or courses for diagonal receiving coils each offset by approximately 90 degrees being displayed for both of the curves. The two curves 42 and 44 are symmetrical and only distinguished by their sign.

Unique recognition of the direction of mounting is possible from the sign, as is clearly demonstrated by these curves. In practice, therefore, it need only be ensured that the direction of mounting is different in the two tire sensors in order to be able to clearly distinguish the tires of a double tire system from one another.

A great advantage of this system is that neither a tangential accelerometer measurement is necessary for double tire recognition nor an additional second antenna. The use of a single transmitter antenna and one receiving coil each in a tire sensor WU is sufficient.

Figure 4:
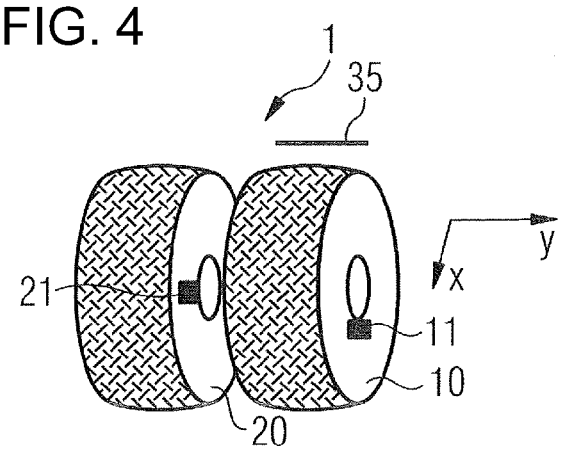
FIG. 4 is a perspective view of an alternative configuration of the LF coil above a contact surface of one of the two tires.

FIG. 4 shows a further exemplary embodiment. In this exemplary embodiment too, the receiving coils are also mounted diagonally in the tire sensors 11, 21. However, the LF antenna or coil 35 is now approximately in the center above the contact surface of the outer tire 10 of the two double tires. Moreover, the directions x and y are also indicated for better recognizability.

The configuration of the LF antenna 35 above one of the two tires 10, 20 is not absolutely necessary in this case. It is equally possible to mount the LF antenna in the center above the two tires. Both evaluations in FIG. 5 and FIG. 6 show this.

Figure 5:
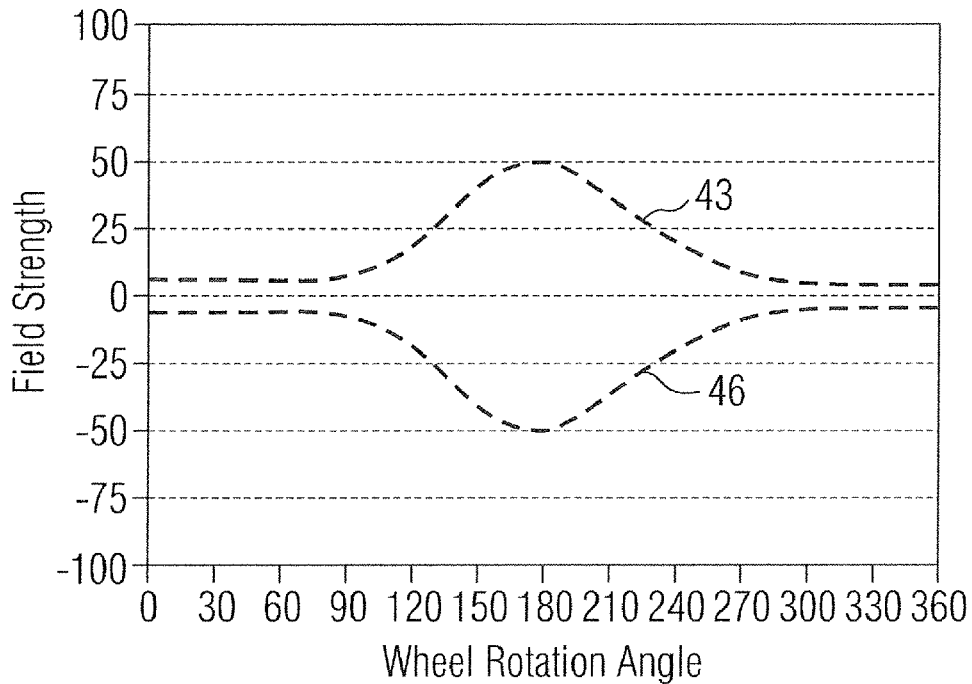
FIG. 5 is a graph illustrating a field strength distribution or course in a symmetrical configuration of the antenna through a double tire system.

The graph in FIG. 5 shows the measured field strengths in an LF antenna 35 disposed symmetrically, i.e. centrally, above both tires. Since the receiving coils of the tire sensors 11, 21 are diagonally positioned and mounted in different directions, symmetrical distributions or courses of the measured field strengths 43, 46 are produced, as in the system according to FIG. 3, as a function of the angle of rotation of the tire and differ only by their sign. In this case too, the two tire sensors 11, 21 can be differentiated from each other by the sign in the measured field strength.

Figure 6:
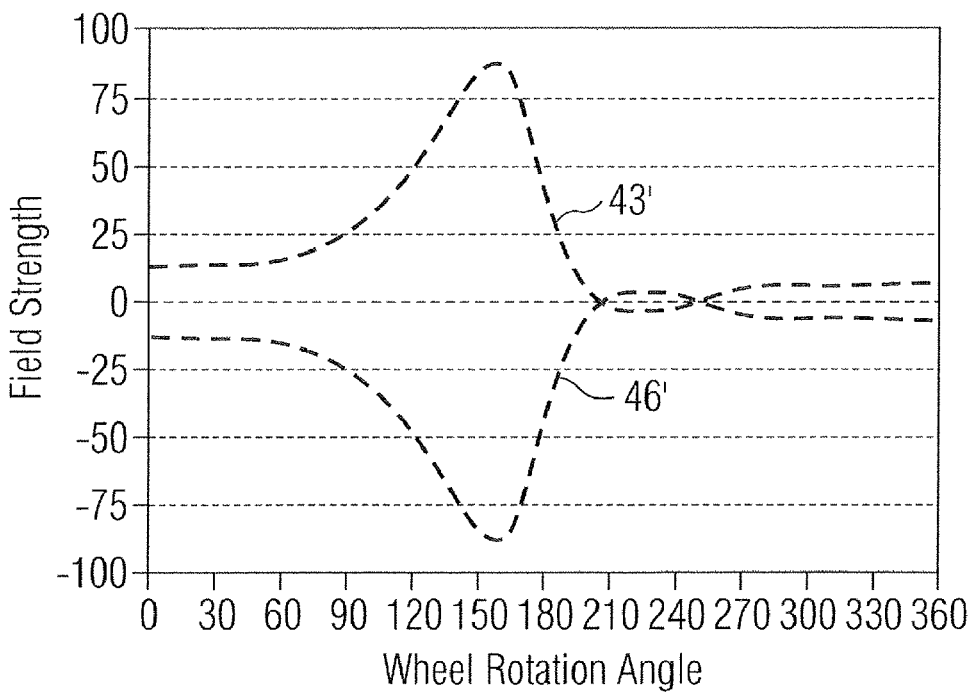
FIG. 6 is a graph illustrating a field strength distribution or course in an asymmetrical configuration of the coil through a double tire system.

An asymmetrical distribution or course of the measured field strengths as a function of the angle of rotation of the tire can be seen in FIG. 6. In this case, as is shown in FIG. 4, the LF antenna 35 was asymmetrically disposed above one of the two tires 10, resulting in asymmetry of the field strength of the received signal through the angle of rotation. However, the two signal distributions or courses 43' and 46' of the two tire sensors 11, 21 of the double tire with differently disposed diagonal receiving coils also clearly differ in this case in the sign, so that the position of the two tire sensors 11, 21 in the double tire system 1 can be clearly distinguished from each other.

A further embodiment also emerges from a mounting of the LF antenna in an asymmetrical manner over the contact surface of one of the two double tires, for instance as shown in FIG. 4.

In such a system, the received field strengths differ from each other, which is above all due to the tire sensor which is mounted immediately below the LF antenna only detecting the y components of the signal, but not its x components.

By contrast, the other tire sensor, which is disposed to one side of the LF antenna, receives both an x and a y component of the signal.

This makes it possible to distinguish the position of the two tires from each other through the use of the different distribution or course of the field strength in the x and y directions.

Figure 7:
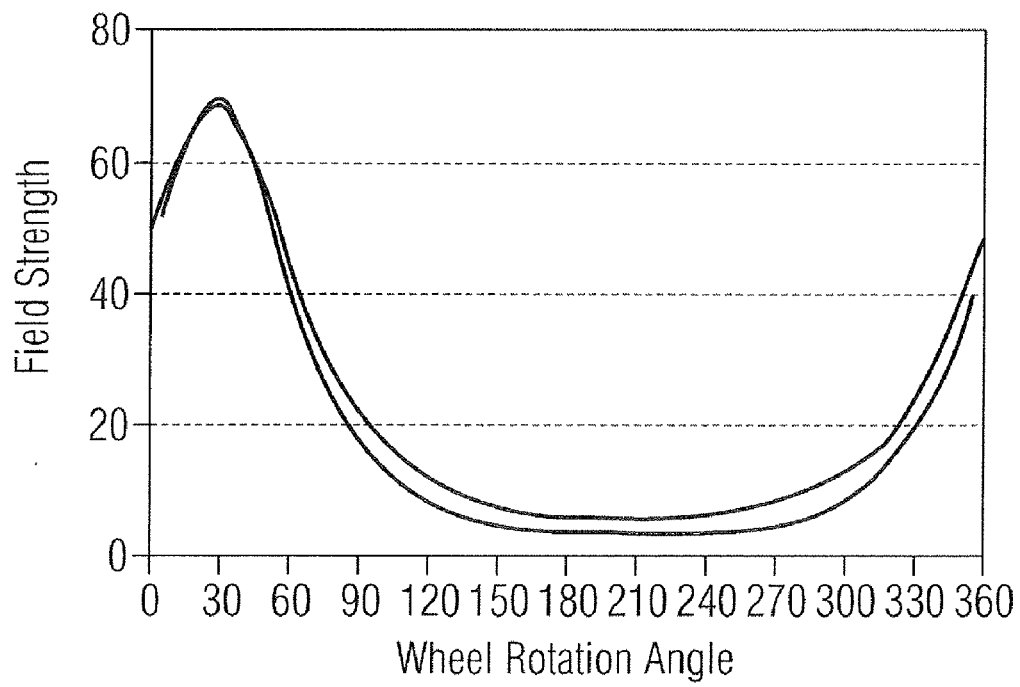
FIG. 7 is a graph illustrating a field strength distribution or course in directions x, y and z for a tire below the antenna.
Figure 8:
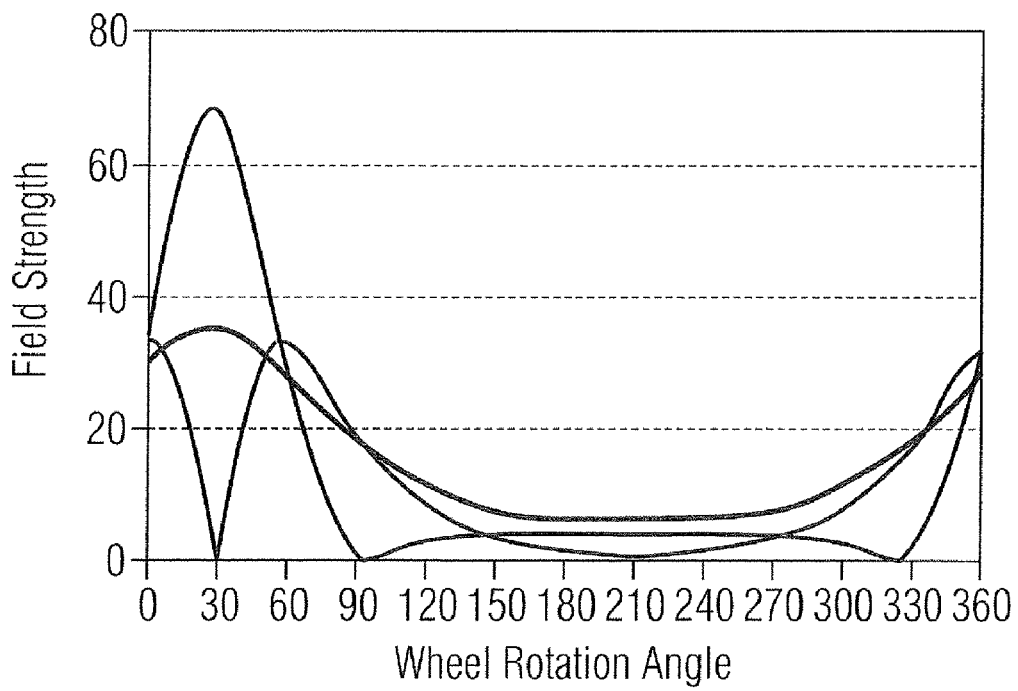
FIG. 8 is a graph illustrating a field strength distribution or course in the directions x, y and z for a tire next to the antenna.

FIG. 7 shows the measured field strengths of the tire sensor 11 below the LF antenna 35. It can be seen that substantially only one component is detected. FIG. 8 shows the field strength distribution or course in different directions for the other sensor WU 21 not disposed immediately under the LF antenna 35. It can be seen that a plurality of signal components is detected in this case.

A last exemplary embodiment emerges from a mounting of the LF antenna next to the double tire system, as is shown in FIG. 2. Unlike the first exemplary embodiment, the receiving coils of the tire sensors are not necessarily disposed diagonally.

In this exemplary embodiment the amplitude of the LF signal in the direction x and/or y is measured by the tire sensors. The tire sensor which is mounted closer to the antenna will receive the signal with a greater amplitude than the other tire sensor which is further away from the antenna.

It has proven advantageous in this situation if only the amplitude swing and not the absolute level is measured and transmitted, since this enables the removal of fluctuating offset effects, for instance due to temperature or weather.

In a special embodiment of this exemplary embodiment, the LF power is not measured in the tire sensor but after detection of the LF signal in the tire sensor action is taken, for instance a change of status, which in turn is transmitted and evaluated. The LF transmission power is then gradually reduced. As soon as one of the two tire sensors no longer reacts with a change of status, it is known that the tire sensor which no longer responds first is the one which is further from the LF antenna. If the LF antenna is on the inside of the wheel arch, for instance, the tire sensor no longer responding first is the tire sensor mounted in the outer tire.

In all of the aforementioned exemplary embodiments, the different field strengths measured by the tire sensors must be evaluated. For this purpose, the tire sensor transmits the received signals through an antenna, preferably through an intelligent receiver unit IDA, to the central processing unit 70, which preferably undertakes these evaluations. The individual conditions which are met for the various tire sensors are also stored in the central processing unit 70 so that specific assignment of the tire position can take place in the central processing unit.

Naturally, a possible alternative is to distribute this evaluation intelligence of the system and to distribute the evaluation to several decentralized locations, for instance in the tire sensors themselves.

In each case, it is important that the position of a tire sensor in the double tire can be clearly determined by appropriate evaluation of the field strength and if necessary its direction, without the need for a second LF antenna.

The invention claimed is:

1. A device for distinguishing positions of tire sensors of a double tire on a vehicle, the device comprising:
   two tire sensors each associated with a respective tire of the double tire;
   a central processing unit disposed on the vehicle;
   an LF antenna disposed on the vehicle and connected to said central processing unit;
   said tire sensors having a device for measuring field strength of a signal emitted by said LF antenna, and said tire sensors reporting back information about the measured field strength through said LF antenna to said central processing unit; and
   said central processing unit determining the positions of said two tire sensors of the double tire by comparing a sign of the measured field strength reported from the one of said two tire sensors with a sign of the measured field strength reported from the other one of said two tire sensors.

2. The device according to claim 1, wherein said tire sensors have a microprocessor unit for processing the measured field strengths.

3. The device according to claim 1, wherein the tires define a direction of rotation and a direction of a tire axle, and said tire sensors have a receiving coil mounted at an angle relative to both the direction of rotation and the direction of the tire axle.

4. The device according to claim 1, which further comprises another antenna, said tire sensors determining a direction of current flow of the signal from said LF antenna received by said tire sensors and reporting through said other antenna to said central processing unit, and said central processing unit determining the sign of the measured field strength reported from the one of said two tire sensors and the sign of the measured field strength reported from the other one of said two tire sensors from the direction of current flow.

5. The device according to claim 4, wherein said other antenna is an intelligent receiver antenna.

6. The device according to claim 1, wherein said LF antenna is disposed next to the double tire.

7. The device according to claim 1, wherein said LF antenna is in a horizontal position.

8. The device according to claim 6, wherein said LF antenna is in a vertical position.

9. The device according to claim 1, wherein said LF antenna is attached above a contact surface of one of two tires of the double tire.

10. The device according to claim 1, wherein said tire sensor substantially only receiving Y components of the signal emitted from said LF antenna is identified as said tire sensor rotating beneath said LF antenna.

11. A method for distinguishing positions of two tire sensors of a double tire, the method comprising the following steps:
   providing a device according to claim 1;
   measuring the field strength of the signal emitted by said LF antenna;
   evaluating both field strengths received from said two tire sensors; and
   assigning said tire sensors to a particular position at the double tire depending on a comparison of a sign of the measured field strength reported from the one of said two tire sensors with a sign of the measured field strength reported from the other one of said two tire sensors.

12. The method according to claim 11, which further comprises placing a receiving coil of said tire sensor at an angle relative to both a direction of rotation of the tire and a direction of a tire axle, and determining a direction of current flow of the signal received from said tire sensor by said LF antenna.

13. A method for distinguishing positions of two tire sensors of a double tire on a vehicle, the method comprising the following steps:
   providing a device having an evaluation unit disposed on the vehicle, at least one LF antenna disposed on the vehicle laterally next to the double tire and connected to the evaluation unit for emitting signals with variable power, and tire sensors each associated with a respective tire;
   selecting a transmission power, for transmission of a signal through the LF antenna, high enough to enable reception by the two tire sensors of the double tire;
   transmitting a signal through the LF antenna to the tire sensors;
   checking if both tire sensors have received the signal transmitted by the LF antenna;
   if both tire sensors have received the transmitted signal, gradually reducing the LF transmission power for transmission of the signal through the LF antenna and repeating the transmitting and checking steps until only one tire sensor receives the transmitted signal; and
   if only one tire sensor has received the transmitted signal, assigning the receiving tire sensor to a position nearest the LF antenna and assigning the other tire sensor having no longer received the transmitted signal to a position furthest from the LF antenna.

14. The method according to claim 13, which further comprises performing a change of status of one tire sensor receiving a signal transmitted by the LF antenna and thus causing a transmission of a signal to evaluate the transmission of a signal from the tire sensor after a prior transmission of a signal by the LF antenna as confirmation of receipt of the LF signal by the tire sensor.

15. The method according to claim 13, which further comprises receiving and evaluating the signal transmitted by the tire sensor with an intelligent receiver unit.

16. The device according to claim 1, wherein said LF antenna is centered above a tire of the double tire.

* * * * *